Feb. 16, 1954 — E. C. WOLFERZ — 2,669,467
WELDED TUBING END CONSTRUCTION
Filed April 4, 1950
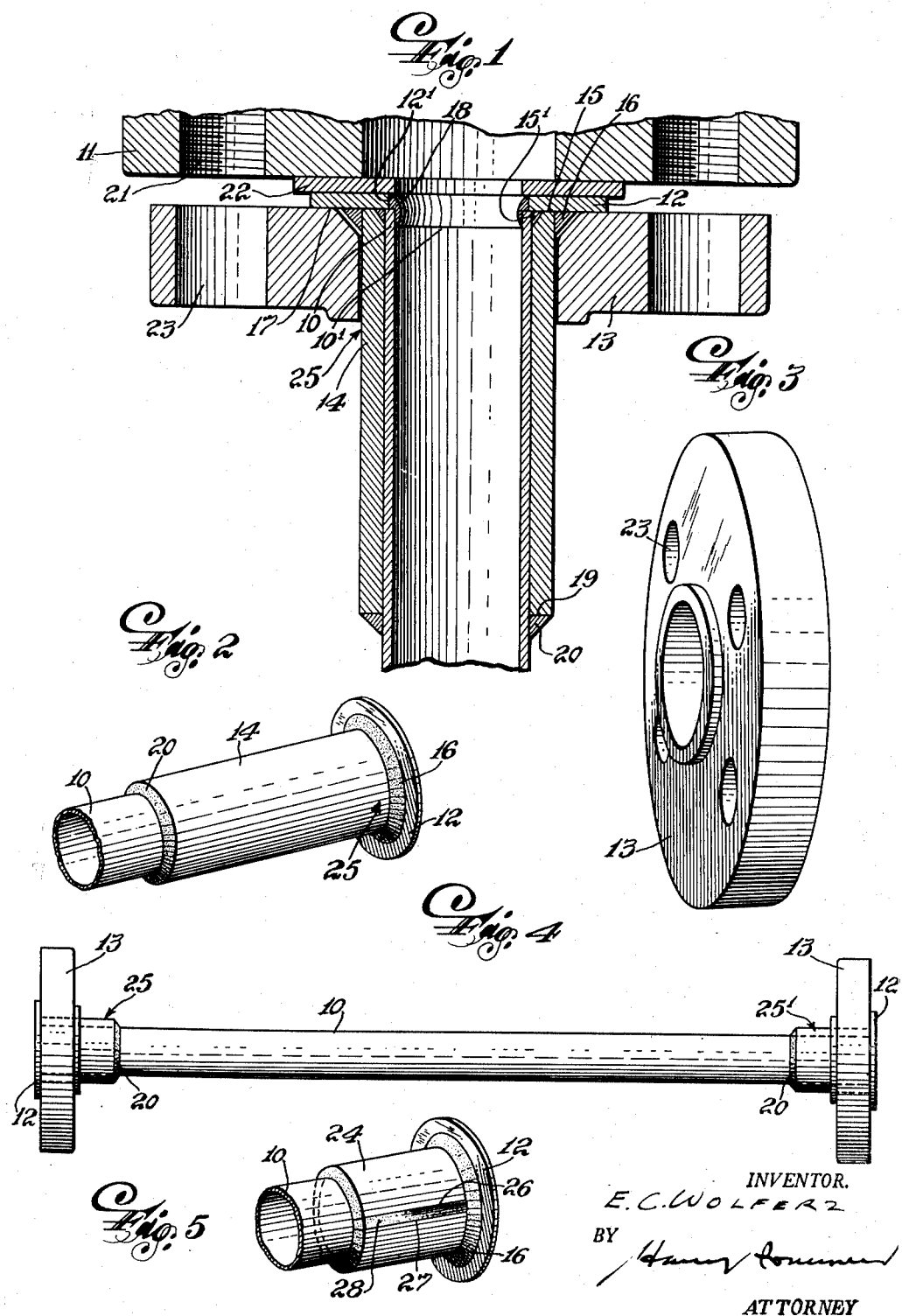
INVENTOR.
E. C. WOLFERZ
BY
ATTORNEY

Patented Feb. 16, 1954

2,669,467

UNITED STATES PATENT OFFICE 2,669,467

WELDED TUBING END CONSTRUCTION

Edwin C. Wolferz, Nutley, N. J.

Application April 4, 1950, Serial No. 153,860

1 Claim. (Cl. 285—138)

This invention relates to improvements in tubing constructions and is more particularly designed to provide the end of a tube with a structure which will facilitate bolting or otherwise securing the same to other tubing or equipment in a manner which will strengthen and protect the tube end.

A further object of the invention is to provide a method of forming the tube ends to facilitate the application thereto of connector members for connecting the same to other lengths of tubing or equipment in a practical and efficient manner.

These and other advantageous objects, which will appear from the drawings, and from the description hereinafter, are accomplished by the structure of my invention, of which embodiments are illustrated in the drawings. It will be apparent, from a consideration of said drawings, and the following description, that the invention may be embodied in other forms suggested thereby, and such other forms as come within the scope of the appended claim are to be considered within the scope and purview of the instant invention.

In the drawings:

Fig. 1 is a fragmentary, sectional view of a tube end constructed pursuant to the invention, and connector parts associated therewith, Fig. 2 is a fragmentary, perspective view of the tube end embodying my invention, Fig. 3 is a perspective view of a flanged disc which may be used to connect the tube end to another member, Fig. 4 is an elevational view of a length of tubing, both ends of which are constructed pursuant to the invention, and Fig. 5 is a fragmentary, perspective view of a tube end embodying a modified form of the invention.

As shown in the drawings, the tube end construction embodying the invention includes a tube 10, one open end of which is to be secured to another member 11, an open end ring 12 being secured to the tube end by welding the inner circumferential walls 10', 12' of the tube end and ring together as at 18 (Fig. 1). The flanged disc 13 or other securing structure is adapted to be positioned against the end ring 12, bolts (not shown) or other means passing through the complementary portions 21, 23 of the members 13 and 11 to secure the tube to the latter. A band 14 is fixed to the tube in encompassing engagement with the end portion thereof, the inner face 15 of one end of the band abutting the end ring 12 and being welded thereto and to the outer face of the tube as at 15'. That end of the band 14 is externally circumferentially welded to the end ring 12 as at 16. The other end 19 of the band is welded to the tube as at 20.

The tube end formed pursuant to the invention is well prepared for the stresses and strains incident to the operation of coupling the same to another tube or other member, and for stresses and strains incident to normal usage, by virtue of the novel construction above referred to. The structure and method of the invention are particularly adapted for facility of assembly and manufacture, as will be apparent. While the invention is not limited thereto, one of the forms in which the same is particularly adapted is for use in connection with tubes of relatively long length. The end construction unit embodying the invention may be embodied in one of the tube ends, as shown in Fig. 1, or in both ends thereof, as shown in Fig. 4, wherein the second end construction unit is designated by the reference character 25'. In Fig. 5, there is shown a form of the invention wherein the band 24 is formed of a flat strip rolled around the end of the tube, the free ends 26, 27 thereof being welded together and to the tube, as indicated by the reference character 28. In some applications, it may be desirable to interpose washer or similar additional members between the disc 13 and the member 11, as indicated at 22 in Fig. 1. Filler wire welding or simple welding procedures may be employed for the making of welds 15', 16', 18 and 20, the sequence of formation of the welds and assembly of the parts in connection therewith being variable to suit various applications of the invention.

Having thus described my invention, what I claim as new and desire to secure by Letters Patent is:

A tube end construction for connection to an open member to pass material flowing through the tube into the open member, comprising a tube of non-corrosive metal having an opening therethrough for registry with the first mentioned open member, a flat ring of non-corrosive metal of an outer diameter substantially greater than that of the tube end, positioned against the end of the tube in butt engagement therewith and provided with a medial opening for registry with the tube end opening, the inner, adjacent portion of the tube and ring being welded together, a weld at adjacent external portions of the tube and ring uniting the same to define a substantially integral, continuous wall of L-shaped construction, and a strengthening band positioned on the tube in encompassing engagement with the end portion thereof and in abutment with said ring within said L-shaped wall, completely shielded by said wall from the opening of the ring and tube, the end of the band being partly recessed to receive the weld at the juncture of the external portions of the tube and ring within the recess, said band being externally welded to the face of the ring, and a disc having a medial opening therethrough slightly greater than the outer diameter of the reenforcing band, so that said disc may be slidably disposed on said band and against the ring in butt engagement with the ring, to enable the tube end construction to be secured to said open member.

EDWIN C. WOLFERZ.

References Cited in the file of this patent

UNITED STATES PATENTS

| Number | Name | Date |
|---|---|---|
| 1,270,045 | Murray | June 18, 1918 |
| 2,136,474 | Straty | Nov. 15, 1938 |
| 2,157,357 | Straty | May 9, 1939 |
| 2,216,033 | Hopkins | Sept. 24, 1940 |
| 2,308,307 | Robinson | Jan. 12, 1943 |
| 2,496,677 | Reedy | Feb. 7, 1950 |

FOREIGN PATENTS

| Number | Country | Date |
|---|---|---|
| 660,065 | Germany | Apr. 21, 1938 |
| 120,462 | Germany | May 10, 1900 |